United States Patent [19]

Colmet et al.

[11] Patent Number: 4,576,836

[45] Date of Patent: Mar. 18, 1986

[54] METHOD FOR PRODUCING A REFRACTORY COMPOSITE STRUCTURE

[76] Inventors: Robert Colmet, 129 avenue de Saint Médard, Eysines, France, 33320; Roger Naslain, Résidence du Pontet "Les Joncs", avenue du Pontet, Pessac, France, 33600; Paul Hagenmuller, 351, avenue de la Libération, Talence, France, 33405; Pierre Lamico, 37, rue Louis Pasteur, Bruges, France, 33520

[21] Appl. No.: 459,332

[22] Filed: Jan. 19, 1983

[30] Foreign Application Priority Data

Jan. 22, 1982 [FR] France ................... 82 01025

[51] Int. Cl.⁴ ............................................. C23C 16/00
[52] U.S. Cl. ............................ 427/255; 427/255.3; 427/376.2; 427/419.2; 427/419.3
[58] Field of Search ............... 427/255.3, 255.7, 255, 427/299, 376.2, 419.1, 419.3, 419.2

[56] References Cited

U.S. PATENT DOCUMENTS

| | | | |
|---|---|---|---|
| 2,578,956 | 12/1951 | Weinrich | 427/255 |
| 3,386,918 | 6/1966 | Hough et al. | 252/63.5 |
| 4,205,032 | 5/1980 | Walters et al. | 264/60 |
| 4,252,588 | 2/1981 | Kratsch et al. | 156/73.6 |
| 4,325,930 | 4/1982 | Vallet | 264/63 |

FOREIGN PATENT DOCUMENTS

| | | | |
|---|---|---|---|
| 0045291 | 2/1982 | European Pat. Off. | 427/255.3 |
| 520209 | 4/1972 | Switzerland | 427/255 |
| 1353384 | 5/1974 | United Kingdom | |

OTHER PUBLICATIONS

British Patent Application No. 2,053,873–Intl. Cl. No. C01B 31/00–dated Feb. 11, 1981.
A D Report by Philip Wong, et al., entitled Chemical Vapor Deposition of Polycrystalline Aluminum Oxide, Oct. 1969.

*Primary Examiner*—Sadie L. Childs
*Attorney, Agent, or Firm*—Brumbaugh, Graves, Donohue & Raymond

[57] ABSTRACT

A refractory fibrous preform in ceramic material is placed inside an infiltration chamber where it is heated within a reacting gaseous mixture introduced into the chamber and containing at least one gaseous hydrolyzing or oxidizing agent and a volatile hydrolyzable or oxidizable compound of the one element or of each element of which the oxide is a constituent of the matrix of the structure to be produced, in order to obtain by chemical reaction an adhesive deposit of said oxide or oxide constituting said matrix and having a melting point higher than 1750° C.; the values of the overall pressure, of the temperature and of the gas flow rates inside the infiltration chamber are selected to be at a level slightly higher than the minimum values necessary for producing the said chemical reaction, so as to enable the constituents of the gaseous reaction mixture to penetrate to the bottom of the pores in the fibrous preform before having reacted completely such that the pores are densified throughout their length with the adhesive deposit.

11 Claims, 1 Drawing Figure

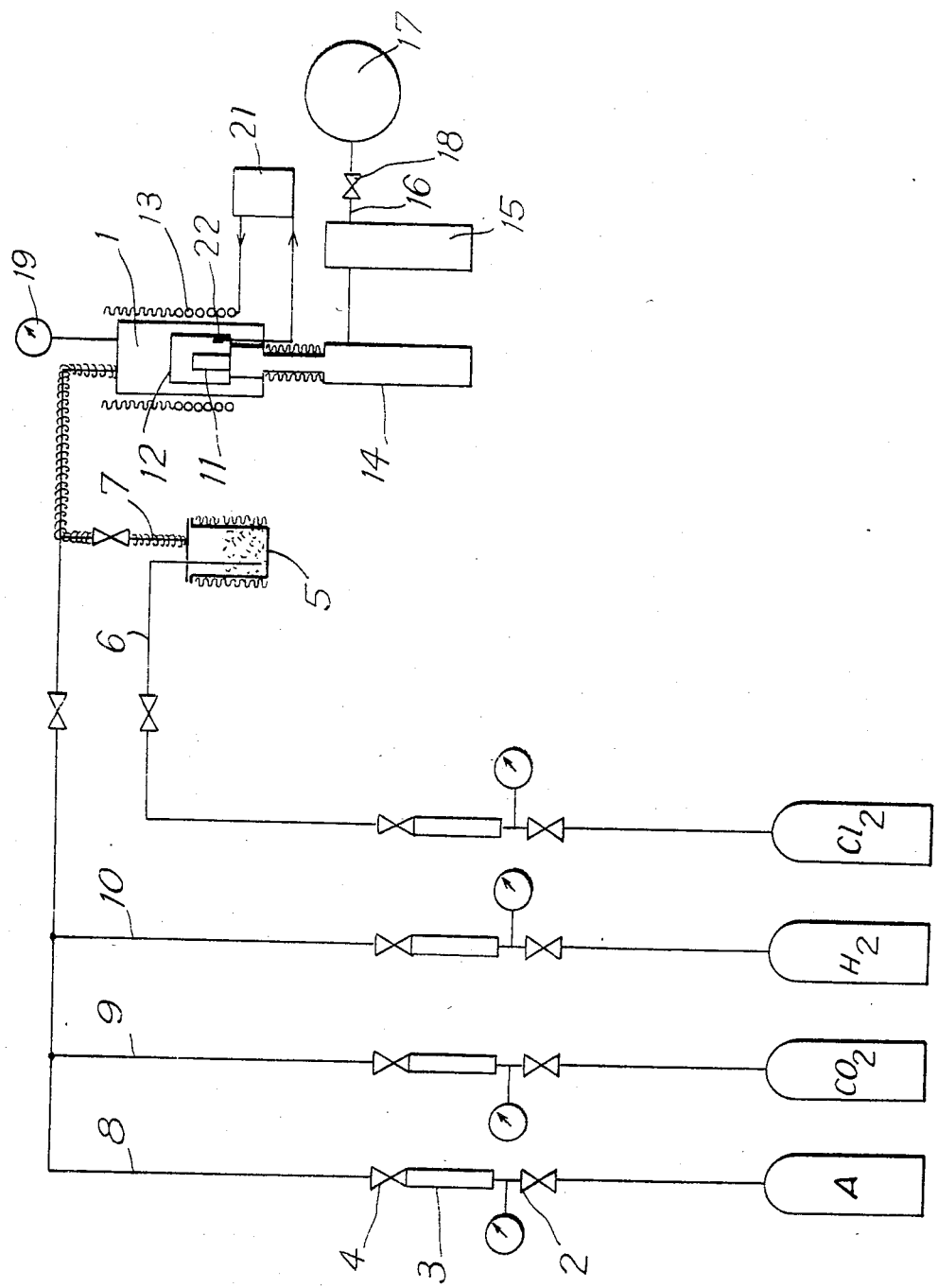

METHOD FOR PRODUCING A REFRACTORY COMPOSITE STRUCTURE

The present invention relates to composite structures of the refractory-refractory type and more particularly to structures comprising a refractory fibrous texture densified by a matrix in refractory material containing one or more oxides.

By fibrous texture is meant here a texture made up of yarns, fabrics, felts, mats, rods, disposed in random or orderly manner, and having optionally received a pre-treatment of rigidization by chemical vapor or liquid deposition.

Composite structures of the carbon-carbon type are already known, which structures are constituted of a porous preform of carbon fibers, which preform is densdensified in gaseous phase by chemical infiltration of a carbon-containing matrix. The advantage of composites of this type has been largely shown in many thermo-mechanical applications, and in particular in the aerospace field (materials for nozzles, thermal protection f re-entering bodies). These same materials have also found applications in various other fields (such as brake discs and bone prostheses for example). But despite their many known advantages, the carbon-carbon structures present certain disadvantages which are linked to the intrinsic chemical properties of carbon. For example, they cannot be used continuously in an oxidizing atmosphere at temperatures higher than about 500° C., without deteriorating significantly.

An improvement was found by substituting part of the carbon matrix with silicium carbide which has, both a good resistance to oxidizing and a good chemical compatibility with carbon fibers at high temperature. The composite structures with carbon fibrous architecture and carbon-silicium carbide hybrid matrix, can also be prepared by chemical vapor deposition as described in French Patent Application No. 2 401 888. These composite structures are found to have greatly improved thermo-mechanical properties in oxidizing atmospheres over the carbon-carbon structures, and this up to temperatures reaching 1500° C. for short periods. However, the resistance to oxidizing which is due to the protection given to the carbon by the silicium carbide, has a tendency to diminish if the oxidizing agent can spread through the material due to the formation of microscopic cracks. So that, any carbon fiber losing its silicium carbide protection becomes preferentially oxidized and constitutes a way for the oxidizing agent to spread through. Therefore it is difficult to expect using said composites for long periods of time in an oxidizing atmosphere at temperatures higher than about 1200° C.

Another improvement can be made by replacing simultaneously the carbon fibers and matrix by silicium carbide, as described in European patent application No. 0032 097. The composite structures comprising a preform of silicium carbide fibers densified by silicium carbide have an improved resistance to oxidizing, compared with the carbon-carbon composites in which only part of the carbon matrix has been replaced by silicium carbide. The use of the SiC-SiC composite structures remains however limited in an oxidizing atmosphere, because of the volatility of the silica layer of protection formed on the surface—which becomes significant from around 1500° C.—, and over that temperature, by the thermal decomposition of the silicium carbide itself.

For a utilization at high temperature and in an oxidizing atmosphere, British Pat. No. 1 353 384 proposes to produce a zirconia-zirconia type composite. This material is produced by impregnation of a structure of zirconia fibers whith a solution containing a zirconium salt and a refractory oxide suspension, followed by a pyrolysis at an adequate temperature to convert the zirconium salt into zirconia. This method, even with repeated impregnation-pyrolysis cycles, leads to a matrix which has poor mechanical characteristics and with a high residual porosity.

It is the object of the present invention to propose a method for obtaining a composite which combines a very good behaviour in an oxidizing atmosphere and under high temperatures, with high mechanical properties.

This object is reached with a method of the type consisting of densifying a refractory fibrous preform in a ceramic material by way of a matrix which is, at least for the most part, constituted by at least one refractory oxide with a melting point higher than 1750° C., wherein, according to the invention, the fibrous preform is placed inside an infiltration chamber where it is heated within a reacting gaseous mixture introduced into the chamber and containing at least one gaseous hydrolyzing agent or oxidizing agent and a volatile hydrolizable or oxidizable compound of the one element or of each element of which the oxide is a constituent of the matrix of the structure to be produced in order to obtain by chemical reaction an adhesive deposit of said oxide or oxides constituting said matrix, the values of the overall pressure, of the temperature, and of the gas flow rates inside the infiltration chamber being selected to be at a level slightly higher than the minimum values necessary for producing the said chemical reaction, so as to enable the constituents of the gas reaction mixture to penetrate to the bottom of the pores in the fibrous preform before reacting such that the pore is densified with the adhesive deposit rather than occluded thereby.

Amongst the oxides having a melting point higher than 1750° C., those specifically contemplated for the present invention belong to the series of refractory oxides which can be formed from the gaseous phase, particularly titanium oxide ($TiO_2$, $TiO_3$), zirconium oxide ($ZrO_2$), hafnium oxide ($HfO_2$), thorium oxide ($ThO_2$) uranium oxide ($UO_2$), chromium oxide ($Cr_2O_3$) and aluminium oxide ($Al_2O_3$). However, other oxides which are difficult to form from the gaseous phase, such as beryllium oxide (BeO), magnesium oxide (MgO) or calcium oxide (CaO) can be included to form part of the composition of the matrix, if their introduction into the pores of the fibrous preform is accomplished by standard liquid impregnation. The densification of the structure is thereafter completed by chemical vapor deposition by infiltration of one of the oxides capable of being deposited by this method, inside the residual pores.

Preferably, the fibrous texture and/or the matrix are at least for the most part constituted by alumina and/or zirconia.

However, as a variant, mixtures of alumina and zirconia can be used and other oxides melting at more than 1750° C. may be used alone, or mixed together or mixed with alumina or zirconia. Other thermically less stable oxides can also be used (for example boron oxide) added in limited quantity to one or more oxides melting at more than 1750° C. and infiltratable by the vapor method, which remains the main constituent of the fibrous texture and/or of the matrix.

It should be noted that according to the method of the invention, the matrix based on refractory oxides is deposited on the bottom of pores by a chemical reaction involving the use of reactant gases. Compared with the densifying technique by the liquid deposition method indicated in aforementioned British patent No. 1 353 384, the oxide formed by chemical vapor deposition is of better quality from crystallographic and microstructural standpoints; in particular, it is much less porous since the pores, of very small diameter, can be infiltrated by the vapor deposition method whereas they cannot be impregnated by the liquid deposition method. As a result, the mechanical characteristics of the matrix and consequently of the composite structure, are definitely better.

It will also be noted that since densification by the vapor method is carried out throughout the entire volume of the fibrous preform, said densification distinguishes itself from the superficial coating methods by gas phases. These methods would indeed lead to superficial coatings clogging up the pores and preventing any penetrating infiltrations of gas, hence the impossibility of obtaining a very low residual porosity. Such superficial coating production techniques are described for example in Swiss Pat. No. 520 209 and in document AD-Report No. 701 013 (AMMRC TR 69-24), October 1969, Army Materials and Mechanics Research Center, WATERTOWN, Mass. (U.S.A.) by Ph. WONG et al., entitled : "Chemical Vapor Deposition of Polycrystalline Aluminium Oxide".

The advantage of the composite structures obtained according to the invention, over the materials of the aforesaid prior art, is that they can be used continuously at high temperatures in chemically very aggressive media, due to the good chemical stability of refractory oxides such as alumina and zirconia deposited by the chemical vapor method. They also have, in comparison with the corresponding non-reinforced fritted ceramics, a better resistance to mechanical stresses, to the extent that the presence of a fibrous structure contributes to stopping the propagation of cracks and allows a dispersion of energy by loosening at the level of the fibers-matrix interfaces.

To obtain the densification of the fibrous preform, said preform is placed inside an infiltration chamber where it is heated within the reactant gas mixture introduced into said chamber. By chemical reaction inside the pores of the fibrous texture, there occurs an adhesive deposition of oxide, the values of overall pressure, partial pressure, temperature and gas flowing rate inside the chamber are selected to be slightly above the minimum values required to cause the chemical reaction, so that the kinetics of the process are controlled by the surface reactions (and not by the transfers inside the vapor phase) to enable the diffusion of the constituents of the reactant gas mixture to the bottom of the pores before reacting.

The starting fibrous structure or preform should be made from a material which is chemically and physically compatible with the oxide matrix at the temperatures of infiltration and utilization. Different fibrous materials of the ceramic type are suitable, such as silicium carbide for example; but the preferred materials are those of the oxide type, and in particular the fibers mainly composed of alumina or zirconia. Where alumina is concerned, it is preferable to use fibers which are essentially constituted of corundum rather than glassy fibers with or without an excessive quantity of silica and/or boron oxide. Said latter indeed tend to evolve under the infiltration temperatures, all the more so when the constant temperature periods are longer.

The preferred combinations are first, a fibrous texture of alumina in a matrix of alumina, then a fibrous texture of alumina in a matrix of zirconia, and then a fibrous zirconia texture in a matrix of zirconia.

The preform should present a suitably open porosity, all the more so that the composite structure should have, after fabrication a high voluminal fraction of oxide-type matrix. Such porosity takes the form of pores of a diameter greater than a few micrometres, smaller pores being more difficult to densify completely. The fibres constituting the preform can be disposed in different ways, depending on the applications. They can for example be used in the form of felts, mats, threads, fabrics or rods and arranged in random manner, or on the contrary, in different specific directions (multidirectional weaving). These different dispositions are well known in the field of fibrous reinforcements for composite structures.

The fibers should be held rigidly one with respect to the others before and throughout the densification operation by the vapor deposition method. This condition can be met either by holding the fibers in position with tools which will be subsequently removed once the chemical vapor infiltration has sufficiently bonded the fibers together, or with a pre-treatment of rigidization by the liquid deposition method. In the first case, the— so-called dry—densification of the preform is entirely achieved by chemical vapor deposition. In the second case, the chemical vapor deposition phase which characterizes the method according to the invention, only takes place after a pre-densification by liquid depositin methods known per se. Said pre-densification consists of an impregnating operation in liquid phase, followed by a baking operation, the fibers being held in a mold (or any other piece of equipment). It is advantageous to use as rigidizing agent, a liquid precursor of the material to be subsequently deposited by the chemical vapor deposition method, or a substance capable of leading to a material fairly similar to the latter. Such precursors, such as hydroxide (or alcooxide) gels or hydrolyzable organic compounds, are well-known products, especially in the case of alumina, zirconia and of the products based on alumina and zirconia. Their thermal decomposition during the baking operation following the impregnation by the liquid deposition method, leaves a solid residue in the interstices, this residue cementing the fibers together whilst helping to reduce the initial porosity—which is generally high—of the textures made from fibrous products, until an open residual porosity of between 30 and 60% is reached. Besides alumina and zirconia, the rigidizing material obtained after the baking can belong to the group of the oxides from the following elements : magnesium, calcium, chromium, yttrium, titanium, hafnium, thorium and uranium. In view of what has been indicated hereinabove, the operations preparatory to the fibrous preform, when they necessitate a rigidization or pre-densification by the liquid method followed by a firing operation, should leave a suitable residual porosity with open pores. Also, and contrary to what is indicated in the aforesaid British patent No. 1 353 384, the quantity of rigidizing agent used is selected for example to be just enough to bind the fibers together, whilst retaining enough residual porosity for the final material to have all the mechanical properties characteristic of oxides deposited by the chemical vapor deposition method.

The densification of the porous preform by chemical vapor infiltration must imperatively be conducted, so that the refractory oxide (based for example on alumina and/or zirconia) is selectively deposited through to the bottom of the pores so as to fill in progressively the pores throughout their length and not on the outer surface of the preform, which obviously would close up rapidly the entry to the pores without actually leading to a densification. Therefore the object here is to deposit right through a porous fibrous medium, by chemical vapor infiltration, very high quantities of alumina or of a material containing oxides melting at more than 1750° C. and which can be formed from a gas phase. Indeed, in the extreme case of dry preforms constituted of a close felt of fibers of for example alumina or zirconia, the initial porosity to be filled by infiltration can reach 70 to 80%. Moreover, at end of densification, the deposit of oxide should be feasible inside the pores, of which the diameter becomes smaller and smaller, in order to obtain as reduced a final porosity as possible and, consequently, good mechanical properties. The present invention is therefore obviously different from the known alumina-deposition methods used for producing surface depositions of thin films. This infiltration through the pores is only possible because of the nature and composition of the reactive gas mixture and the conditions of infiltration have been carefully selected, as specified hereinafter.

The formation of a refractory oxide from a reactant gas mixture involves the presence of at least an oxidizable and hydrolizable volatile of the element in question with a chemical gaseous substance capable of oxidizing or hydrolizing at the infiltration temperature. Since the elements forming the oxides melt at over 1750° C., most of them present volatile combinations at medium temperature. The combinations in question are mainly halides (fluorides, chlorides, bromides and iodides) and organo-metallic combinations. By way of example, we can cite in the case of aluminium and zirconium : the fluorides, chlorides, bromides and iodides $AlX_3$ and $ZrX_4$ (with $X=F$, Cl, Br or I) or the organo-metallic compounds such as trimethyl, triethyl, tri-isopropyl, or triisobutyl aluminium, as well as the zirconium secondary isopropyl or butyl. Said combinations can be either directly oxidized by oxygen in controlled conditions of partial pressures, or hydrolized at high temperature by any steam which may have formed in situ, through a chemical reaction. This last method is particularly indicated in the present case inasmuch as it provides for the formation of the alumina solely by immediate contact of the part to be densified brought to a high temperature. An inert gas such as nitrogen or argon for example, can also be added to the gas mixture, as carrier gas or just as a diluting agent.

Although many gas mixtures can be used to form a refractory oxide deposition, such as alumina or zirconia, the preferred gas mixture according to the method of the invention is constituted for the main part of aluminium chloride (or zirconium), or carbon dioxide and hydrogen. The formation of the oxides very likely results from the following reactional balances :

$$3 H_{2(g)} + 3 CO_{2(g)} \rightleftharpoons 3 H_2O_{(g)} + 3 CO_{(g)} \quad (1)$$

$$2 AlCl_{3(g)} + 3 H_2O_{(g)} \longrightarrow Al_2O_{3(s)} + 6 HCl_{(g)} \quad (2)$$

$$2AlCl_{3(g)} + 3H_{2(g)} + 3CO_{2(g)} \longrightarrow Al_2O_{3(s)} + 3CO_{(g)} + 6HCl_{(g)} \quad (3)$$

or in the case of zirconia:

$$2 H_{2(g)} + 2 CO_{2(g)} \rightleftharpoons 2 H_2O_{(g)} + 2 CO_{(g)} \quad (1')$$

$$ZrCl_{4(g)} + 2 H_2O_{(g)} \longrightarrow ZrO_{2(s)} + 4 HCl_{(g)} \quad (2')$$

$$ZrCl_{4(g)} + 2H_{2(g)} + 2CO_{2(g)} \longrightarrow ZrO_{2(s)} + 2CO_{(g)} + 4HCl_{(g)} \quad (3')$$

The advantage of using this type of gas mixture is that the formation of water according to (1) is slow and only becomes appreciable from a kinetic standpoint, by operating at sufficiently high temperature, whereas on the contrary the formation of alumina or zirconia according to (2) or (2') is rapid. Seeing that during an infiltration, the chemical species should be able to reach the bottom of the pores by gas phase diffusion before reacting, it is easy to realize all the advantages of such systems wherein the formation of water is delayed by kinetic factors.

As indicated hereinabove, it is essential to prevent, during infiltration a superficial deposition from prematurely obstructing the orifice of the pores, which would stop the process of penetrating-densification.

The deposition to the bottom of the pores is helped by reducing the overall pressure, the deposition temperature and to a lesser extent, the gas flow rate inside the infiltration chamber. In these conditions, the deposition is no longer controlled by the transport, through diffusion into the gas phase, of the initial or transient species, or of the species issued from the deposition reaction, but instead by the kinetics of the surface reactions between the adsorbed species. As a result, the initial or transient species can then reach the bottom of the pores before reacting : the reduction of the overall pressure increases the average path travelled freely by the molecules and help the latter to diffuse through to the bottom of the pores; moreover, when this reduction is combined with a reduction of the deposition temperature, it increases the life period of the initial or transient species, thus allowing them to reach the bottom of the pores. In the light of this, the infiltration temperature, overall pressure and to a lesser degree, the gas flow rate, are reduced to the minimum values permitting an acceptable speed of densification. This is precisely where the infiltration conditions differ from those corresponding to surface depositions. These conditions are all the more imperative since the porosity which remains to be filled is composed of finer and longer pores. As a result, the total densification of a fibrous texture by a refractory oxide according to the chemical vapor infiltration method, is a relatively lengthy operation (since in its very principle, it implies that the kinetics of the surface reactions has been considerably reduced), and although the deposition speed may be quite high at the start of operation, when the available porosity is high, it becomes increasingly slower when the pores shrink. The examples given hereinafter show that, if the infiltration is well conducted, the final residual porosity (pores that are occluded or too fine to be infiltrated) is very small (less than about 10%).

By way of example, when the reactant gas mixture is formed of aluminium chloride and/or zirconium chloride, carbon dioxide and hydrogen, the infiltration is conducted at a temperature between 800° and 1200° C. and preferably at 900°-950° C., under an overall pressure of between $66.10^{-4}$ and 0.40 atm (5 to 300 torrs) and preferably between 0.013 and 0.065 atm (10 to 50 torrs). The total gas flow rate depends on the geometry of the infiltration chamber and on the nature of the parts to be densified; this is, by way of example around 100 $cm^3$/min. for a cylindrical reactor of 60 mm diameter and 110 mm height.

A mixed deposition containing both alumina and zirconia can be produced by mixing aluminium chloride and zirconium chloride with carbon dioxide and hydrogen so as to form the initial gas mixture. In this case, the $AlCl_3$—$ZrCl_4$ mixture contains for example between 5 and 20% by mole of $AlCl_3$.

Instead of alumina or zirconia, it is possible to deposit other refractory oxides melting at more than 1750° C., using the method just described, provided that a mineral or organo-metallic volatile combination of the element corresponding to the oxide is available. Such is the case with the following oxides : $Ti_2O_3$, $Cr_2O_3$, $HfO_2$, $ThO_2$ or $UO_2$, as well as silica (although the latter has a melting point slightly less than 1750° C.). In the same way, it is possible to densify a porous fibrous texture with binary or ternary oxides derivated from the aforementioned simple oxides, or by using mixtures binding said oxides or their combinations together or with oxides which are less refractory ($B_2O_3$ for example) but capable of advantageously modifyihg the properties of the depositions, for the purpose of specific applications, when they are added in small quantities to the oxides melting above 1750° C. In these various cases, the initial gas mixtures used contain, in addition to the carbon dioxide and hydrogen, the volatile combinations necessary to the transport by the gaseous method of the different elements—other than oxygen—constituting the refractory deposition. Also, with the object of conferring to the composites certain special properties, the matrix may present a composition gradient from the fibers. Then, the composition of the gas mixture used for the infiltration varies in relation to time, either continuously, or at intervals, depending on the application.

In the case of composite structures with an alumina matrix, it is advantageous for this to be constituted of corundum ($Al_2O_3$-$\alpha$) which is stable up to the melting point and enjoys improved properties over the other varieties of alumina. The nature of the alumina deposited at the bottom of the pores during the infiltration process is mainly dependent on the temperature. At temperatures below about 900° C., the depositions contain more or less crystallized transient aluminas. Above 900° C. on the contrary, the depositions are mostly constituted of corundum.

In the case of composite structures with a matrix based on pure zirconia, $ZrO_2$ is in monoclinic or quadratic form at the set infiltration temperatures (around 950° C.). Because of the shattering effect of the transformation $ZrO_2(m) \rightleftarrows ZrO_2(g)$ (which is due to the volume variation accompanying the transformation and to its martensitic character), the block ceramics containing $ZrO_2$ should be produced with zirconias, which have been totally or partly stabilized (with the addition of small quantities of oxides such as CaO, MgO, $Y_2O_3$). Zirconia can, in most cases, and in particular whenever its voluminal fraction remains relatively low in the composite, be deposited in pure form—i.e. unstabilized—provided that it is infiltrated into a network of very fine pores within a fibrous structure which is mechanically very strong. However, if in certain cases, it proves necessary for the matrix to be constituted mainly of stabilized zirconia (composite structures with high voluminal fractions of matrix for example), the infiltration is then carried out by way of a mixed deposition of zirconia and of an oxide which is a zirconia stabilizer and depositable by the chemical vapor method. As a variant, a densification may be effected wherein chemical vapor infiltrations of $ZrO_2$ alternate with an impregnation by the liquid method of a precursor of the stabilizing oxide, followed by baking if it proves unpractical for the stabilizing oxide to be supplied by the chemical vapor method (such as CaO, MgO, $Y_2O_3$ for example). The fact remains that, in this last case, the sole object of the impregnation by the liquid method is to bring the required quantity of stabilizing oxide, the mechanical properties of the final material and its high compacity being the principal consequence of chemical vapor densification.

Reference will now be made to the single accompanying figure which diagrammatically illustrates an installation for carrying out the infiltration method according to the invention.

The illustrated case, given by way of example and non-restrictively is that wherein a reactant gas mixture is constituted essentially of a metallic chloride—aluminium chloride ($AlCl_3$) or zirconium chloride ($ZrCl_4$)—of carbon dioxide ($CO_2$), of hydrogen ($H_2$) and of an inert gas (argon).

The gases are brought into an infiltration chamber 1 by way of gas lines comprising, as known per se, check valves 2, flowmeters 3 and regulating valves 4.

The metallic chloride is obtained by reacting chlorine (or hydrogen chloride HCl) admitted through a conduit 6 over metal cuttings from the corresponding metal inside a chloridizer 5. The metallic chloride formation reaction is conducted at around 280° C. for $AlCl_3$ and around 400° C. for $ZrCl_4$. The volatile metallic chloride produced in 5 is brought into the infiltration chamber via a conduit 7 which is thermostat-regulated to avoid the condensation of the metallic chloride.

The other components of the reactant gas mixture are conveyed through conduits 8, 9, 10 joining up with the thermostat-regulated conduit 7 upstream of the infiltration chamber 1.

One or more preforms to be densified 11 are placed inside a casing 12 in a refractory and conducting material which is chemically compatible with the atmosphere prevailing inside the chamber 1, is brought to a high temperature by induction of high frequency current flowing in an inductor 13.

At the outlet from infiltration chamber 1, the walls of which are thermostat-regulated, the volatile metallic chlorides present in the initial gas mixture and which have not reacted, as well as any such chlorides which may have formed during the reaction (zirconium subchlorides for example), are condensed in a receptacle 14. Hydrogen chloride HCl which has been produced is neutralized by soda contained in a receptacle 15 whereas the remaining gases, amongst which any carbon monoxide which has formed and optionally argon, are extracted through a pipe 16 by way of a pump 17.

A valve 18 is mounted on pipe 16 in order to regulate the flow of extracted gases and thus keep the overall pressure inside the chamber 1 at the desired value, which pressure is measured by an apparatus 19. An electrovalve 18 can be used, which valve is automatically controlled by a control chain receiving on the one hand, a signal representing the desired pressure in the infiltration chamber 1, and, on the other hand, a signal delivered by a pressure pick-up and representing the real pressure inside the chamber 1.

In like manner, a temperature regulation is conducted by means of a control chain 21 which is connected to a temperature sensor 22 housed inside chamber 1 and controlling the electric power supplied to the inductor 13.

The above-described installation therefore provides for an isothermal gas infiltration with regulation of the overall pressure and separation of the condensable gases or of any gases of which the exhaust into the atmosphere could be dangerous.

The following examples are given non-restrictively to illustrate the invention.

EXAMPLE 1

Composite structures with alumina matrix and unidirectional reinforcement of alumina fibers (fibers of the type marketed under the name "FP" by the United States firm "DU PONT DE NEMOURS") are produced by chemical vapor infiltration, from a gas mixture containing aluminium chloride, carbon dioxide and hydrogen. The starting fibrous products are made into dry, parallelepiped preforms of 100 mm length and $50 \times 50$ mm$^2$ cross-section, held in position by tool equipments and representing a 60% porosity. The fibers inside these preforms, are arranged in parallel, in the direction of the longest length. Said preforms are placed inside the infiltration chamber and subjected to cycles of densification using a gas mixture composed of: 10% $AlCl_3$, 30% $CO_2$ and 60% $H_2$ whereas their temperature T is set at 950° C., the overall pressure p inside the infiltration chamber is kept at $26.10^{-3}$ atm (20 torrs) and the total gas flow rate is fixed at 100 cm$^3$/min. The densification is conducted for 300 hours.

The composite structures so obtained were subjected to various types of physico-chemical analyses. The analysis of metallographic samples under an optical microscope and an electron scanning microscope, made it possible to establish that the infiltration was homogeneous throughout the preform, the alumina having evenly deposited in the network of pores, without any noticeable accumulation towards the external surface of the preform. The residual porosity was found to be about 10% and could have been even more reduced by extending the duration of the infiltration, as proved by the weight increase in relation to time. The analysis by X-ray crystallography and the elementary analysis by X spectometry microprobe have made it possible to determine that the product deposited inside the pores was for the most part mainly corundum $Al_2O_3$-$\alpha$.

A three-point mechanical characterization under bending stress was made on test pieces ($50 \times 12 \times 2.5$ mm) cut from the structures after infiltration. The bending strength at room temperature was found to be equal to 210 MPa for a residual porosity of 10-12%. The bending strength measured in relation to the porosity $V_e$ (35% < $V_e$ < 10%) extrapolated for a zero residual porosity implied that bending strengths approaching 300 MPa could have been obtained by extending the period of infiltration until total densification.

Tests for bending strength conducted in relation to the temperature showed also that a considerable fraction of the strength determined at room temperature was preserved at high temperatures: 85% at 1000° C., 60% at 1200° C.

This example therefore shows that the production method according to the invention provides for the preparation, by chemical vapor infiltration of, alumina-alumina composite structures which are characterized by a highly compact matrix with high thermomechanical performances.

EXAMPLE 2

The procedure used is as stated in Example 1, using the same fibrous preforms, the same apparatus, the same gas mixture, the same overall pressure p, the same total flow rate D, but with the temperature T of the preforms brought up to 1200° C. It is noted with these conditions that, after a score of hours, a deposition of alumina has formed on the surface of the preform, clogging up the pores and preventing any deeper infiltration.

EXAMPLE 3

The procedure is again as indicated in Example 1, but the overall pressure p inside the infiltration chamber is kept to about 0.5 atm, all the other parameters remaining unchanged. After only five hours of treatment, it is observed that a surface deposition has formed, similar to that reported in Example 2, which deposition obstructs the orifices of the pores and prevents any further densification.

Examples 1 to 3 clearly show that very specific conditions have to be met in order to obtain composite structures with alumina matrix from porous fibrous preforms subjected to a densification treatment by chemical vapor deposition. If said conditions are not met (i.e. 800 < T < 1200° C. and preferably 900 < T < 950° C., on the one hand and $66.10^{-4}$ < p < 0.40 atm and preferably 0.02 < p < 0.06 atm, on the other hand) the alumina, instead of diffusing inside the pores, settles on the external surface of the preforms and does not cause their densification.

The chemical vapor infiltration of alumina inside the pores of the preforms produced according to the method of the invention is therefore clearly different from the forming of the external coatings even though these coatings may use gas mixtures of similar composition.

EXAMPLE 4

Fibrous preforms similar to those used in the preceding examples are rigidized and pre-densified by the liquid deposition method in order to reduce their initial porosity—then they are subjected to a chemical vapor infiltration treatment such as described for Example 1. The rigidization is obtained by impregnating, under atmospheric pressure conditions, each dry preform held by way of a tool, with a gel of aluminium hydroxide obtained by hydrolyzing a secondary butylate of aluminium. After repeated impregnation, drying and calcination in the open (1100° C.) the porosity was finally reduced to 50%. The preforms so treated, which need not be held in a tool, were then densified by chemical vapor deposition as indicated for Example 1.

Analyses have shown that the alumina deposited inside the pores during the liquid impregnation cycles was solidly cemented by that formed subsequently by the chemical vapor method. The advantage of this method is to reduce the duration of the chemical vapor infiltration operation, without really reducing noticeably the final mechanical performances largely imposed by the presence of the alumina deposited by the chemical vapor method. It took only 180 hours of infiltration to obtain a final residual porosity of around 10%.

EXAMPLE 5

Composite structures with zirconia matrix and unidirectional fibrous reinforcement of alumina were produced by chemical vapor infiltration using a gas mixture containing zirconium tetrachloride, carbon dioxide and hydrogen. The starting products are constituted by fibrous preforms in alumina similar to those used in Example 1 except that they have been pre-densified with alumina by the chemical vapor deposition method so as to bind their fibers and to reduce their porosity to 25%. Said preforms were placed in the infiltration chamber and densified with a gas mixture composed of: 10% $ZrCl_4$, 30% $CO_2$ and 60% $H_2$, the parameters T and p being set as indicated for Example 1 and the overall flow rate being lowered to 50 $cm^3$/min. The densification is carried out for 200 hours so as to reach a residual porosity of 5–10%.

Analyses have shown that the composite structures so obtained still kept their integrity after a thermal cycle going from room temperature to 1200° C. without excessive fissuring despite the fact that the zirconia present in the matrix was in non-stabilized form.

EXAMPLE 6

Composite structures with mixed zirconia-alumina matrix and unidirectional fibrous reinforcement of alumina are produced by chemical vapor infiltration, using a gas mixture containing $ZrCl_4$, $AlCl_3$, $CO_2$ and $H_2$. The starting products are constituted of fibrous preforms such as those used in Example 1. Said preforms have been pre-densified with a gas mixture composed of: 5% $ZrCl_4$, 5% $AlCl_3$, 30% $CO_2$ and 60% $H_2$, the parameters T and p being set as indicated for Example 1 and the overall gas flow being kept to 70 $cm^3$/min. The densification lasted for 350 hours in order to reach a residual porosity of 10%.

Analyses have shown that the matrix was constituted of zirconia containing about 55% of alumina and 45% of zirconia in moles.

EXAMPLE 7

High capacity zirconia-zirconia structures are produced by chemical vapor infiltration using a gas mixture of $ZrCl_4$—$CO_2$—$H_2$. The starting products are constituted of zirconia fibers arranged and held in a parallel alignment by way of a tool. The tests have been made on preforms of 60 mm length and 30×15 mm2 cross-section, the fibers being preferably oriented lengthwise. The initial porosity of the preforms is around 70%. This is then reduced to 50% by impregnation-pyrolysis cycles, using a zirconium hydroxide gel obtained from secondary butylate of zirconium, as already indicated with reference to Example 4 in the case of alumina. The preforms, so rigidized, are then infiltrated by the chemical vapor infiltration method, the infiltration parameters being set as indicated for Example 5. The infiltration is conducted for 300 hours, so as to reach a residual porosity of 10%.

The metallographic samples and analysis under the electron scanning microscope have shown that the zirconia deposited by the chemical vapor method in the second part of the process has deposited through the microporosity found in the zirconia obtained from the pyrolysis of the hydroxide gel and also through the macropores which had not been filled by the impregnation-pyrolysis cycles. This proving that the matrix is homogeneously constituted of zirconia—the zirconia deposited by the chemical vapor deposition method having rigidized the (very porous) zirconia issued form the hydroxide gel.

A three-point test for bending conducted at room temperature on a test piece of 50×12×2.5 mm revealed a bending strength of 190 MPa for a residual porosity of 12%. Higher bending strength values could obviously have been found if densification had been total.

For the deposition of a zirconia matrix, the use of the method according to the invention, namely the chemical vapor infiltration, using a gas mixture ($ZrCl_4$—$CO_2$—$H_2$), gives a compact zirconia (with low residual porosity) with good mechanical properties. On the contrary, the impregnation by the liquid method leads to a porous zirconia with poor mechanical properties. By way of example, the method described in British Pat. No. 1 353 384 leads to a structure which has a residual porosity of 32% corresponding to a bending strength of around 42 to 55 MPa.

What is claimed is:

1. Method for producing a refractory composite structure, comprising the densification of a refractory fibrous preform in ceramic material by a matrix at least partly constituted by an oxide having a melting point higher than 1750° C. wherein the fibrous preform is placed inside an infiltration chamber where it is heated within a reacting gaseous mixture introduced into the chamber and containing at least one gaseous hydrolyzing or oxidizing agent and a volatile hydrolizable or oxidizable compound of the one element or of each element of which the oxide is a constituent of the matrix of the structure to be produced, in order to obtain by chemical reaction an adhesive deposit of said oxide or oxides constituting said matrix, the values of the overall pressure, of the temperature and of the gas flow rates inside the infiltration chamber being selected to be at a level slightly higher than the minimum values necessary for producing the said chemical reaction, so as to enable the constituents of the gaseous reaction mixture to penetrate to the bottom of the pores in the fibrous preform before having reacted completely such that the pores are densified throughout their length with the adhesive deposit.

2. Method as claimed in claim 1, wherein the fibrous preform is rigidized before conducting the chemical vapor infiltration in order to bind the fibers together, said rigidization being achieved by at least one cycle comprising impregnation by the liquid method with a precursor of a refractory material having a good resistance to oxidization and melting at more than 1750° C., followed by the firing of said precursor, so as to reach an open residual porosity varying between 20 and 50%.

3. Method as claimed in claim 2, wherein the rigidizing material obtained after firing is an oxide of magnesium, calcium, aluminium, chromium, yttrium, titanium, zirconium, hafnium, thorium, or uranium.

4. Method as claimed in claim 2, wherein the precursor of the rigidizing material is a precursor of the hydroxide or alcoxide gel type.

5. Method as claimed in claim 1, wherein the said volatile hydrolyzable or oxidizable compound is a halide.

6. Method as claimed in claim 5, wherein the halide is selected from a group formed by the aluminium and zirconium chlorides.

7. Method as claimed in claim 1, wherein the said volatile hydrolizable or oxidizable compound is an organo-metallic compound.

8. Method as claimed in claim 1, wherein the reactant gas mixture is specifically constituted by at least one of the aluminium or zirconium chloride, carbon dioxide and hydrogen, the overall pressure inside the infiltration chamber being set to a value situated between $66.10^{-4}$ and 0.4 atm and the temperature of the preform being set at a value situated between 800° and 1200°C.

9. Method as claimed in claim 8, wherein the reactant gas mixture contains aluminium chloride and zirconium chloride and the mixture contains between 5 and 20% by mole of $AlCl_3$.

10. Method as claimed in claim 1 to produce a matrix of zirconia which has been partly or totally stabilized with magnesium, calcium and yttrium, wherein a sequence of impregnation with a precursor such as a gel of the stabilizing oxide followed by a firing of the precursor alternates with a sequence of chemical vapor infiltration of zirconia, whereby zirconia is deposited within the pores of the preform to form a compact matrix.

11. Method as claimed in claim 1, wherein the reactant gas mixture is specifically constituted by at least one of the aluminum or zirconium chloride, carbon dioxide and hydrogen, the overall pressure inside the infiltration chamber being set to a value situated between 0.013 and 0.065 atm and the temperature of the preform being set at a value situated between 900° and 950° C.

* * * * *

UNITED STATES PATENT AND TRADEMARK OFFICE
CERTIFICATE OF CORRECTION

PATENT NO. : 4,576,836

DATED : March 18, 1986

INVENTOR(S) : Robert Colmet et al.

It is certified that error appears in the above-identified patent and that said Letters Patent is hereby corrected as shown below:

Cover Page, [76] Inventors:, "Lamico" should read --Lamicq--.
Cover Page, 10th line of ABSTRACT, "oxide" should read --oxides--.
Column 1, line 17, delete "dens-".
Column 1, line 22, "f" should read --of--.
Column 2, line 5, "whith" should read --with--.
Column 2, line 64, after "used" insert --either--.
Column 4, line 36, "depositin" should read --deposition.--
Column 10, line 6, "of," should read --, of--.
Column 12, line 6, "form" should read --from--.

Signed and Sealed this

Second Day of September 1986

[SEAL]

Attest:

DONALD J. QUIGG

Attesting Officer

Commissioner of Patents and Trademarks